(12) United States Patent
Savu et al.

(10) Patent No.: US 11,060,595 B2
(45) Date of Patent: Jul. 13, 2021

(54) NVH MODIFICATION FOR DIFFERENTIAL ASSEMBLY

(71) Applicant: GKN Sinter Metals, LLC, Auburn Hills, MI (US)

(72) Inventors: Virgiliu-Adrian Savu, Allen Park, MI (US); Alfred J. Chiesa, Farmington Hills, MI (US); Timothy E. Geiman, South Lyon, MI (US)

(73) Assignee: GKN Sinter Metals, LLC, Auburn Hills, MI (US)

( * ) Notice: Subject to any disclaimer, the term of this patent is extended or adjusted under 35 U.S.C. 154(b) by 95 days.

(21) Appl. No.: 16/475,992

(22) PCT Filed: Jan. 4, 2018

(86) PCT No.: PCT/US2018/012334
§ 371 (c)(1),
(2) Date: Jul. 3, 2019

(87) PCT Pub. No.: WO2018/129150
PCT Pub. Date: Jul. 12, 2018

(65) Prior Publication Data
US 2019/0346033 A1    Nov. 14, 2019

Related U.S. Application Data

(60) Provisional application No. 62/442,720, filed on Jan. 5, 2017.

(51) Int. Cl.
*F16H 48/08* (2006.01)
*F16H 48/38* (2012.01)
(Continued)

(52) U.S. Cl.
CPC .............. *F16H 48/38* (2013.01); *F16H 48/08* (2013.01); *F16H 55/06* (2013.01); *F16H 57/0483* (2013.01)

(58) Field of Classification Search
CPC .......... F16H 48/38; F16H 48/08; F16H 55/06; F16H 57/0483; F16H 48/06
See application file for complete search history.

(56) References Cited

U.S. PATENT DOCUMENTS 4,516,443 A  *  5/1985  Hamano ................. F16H 48/08
                                                      192/107 M
8,402,659 B2     3/2013  Kotthoff
(Continued)

FOREIGN PATENT DOCUMENTS

DE     102013217315 A1     3/2015
JP        S58181046 U     12/1983
(Continued)

OTHER PUBLICATIONS

PCT International Search Report and Written Opinion, PCT/US2018/012334, dated Apr. 20, 2018, 15 pages.
(Continued)

*Primary Examiner* — Justin Holmes
(74) *Attorney, Agent, or Firm* — Quarles & Brady LLP (57) ABSTRACT

A differential assembly includes one or more NVH-modifying elements that alter and/or reduce at least one of a noise, vibration, and harshness emitted from the differential assembly. The NVH-modifying element(s) are placed in engagement with the side gears of the differential assembly to modify and/or reduce the NVH of the differential assembly.

18 Claims, 4 Drawing Sheets

(51) Int. Cl.
*F16H 55/06* (2006.01)
*F16H 57/04* (2010.01)

(56) References Cited

U.S. PATENT DOCUMENTS

| | | | | |
|---|---|---|---|---|
| 2004/0149062 | A1* | 8/2004 | Atkinson | F16H 48/08 74/424 |
| 2005/0049104 | A1 | 3/2005 | Atkinson et al. | |
| 2006/0078242 | A1 | 4/2006 | Vogt et al. | |
| 2006/0240934 | A1* | 10/2006 | Cradit | F16H 48/08 475/230 |
| 2007/0287569 | A1* | 12/2007 | Miah | F16H 48/08 475/235 |
| 2018/0017150 | A1 | 1/2018 | Leupold et al. | |
| 2018/0162398 | A1* | 6/2018 | Grutter | B60W 30/182 |

FOREIGN PATENT DOCUMENTS

| | | |
|---|---|---|
| JP | H01116250 U | 8/1989 |
| JP | H0650412 A | 2/1994 |
| JP | 2006281264 A | 10/2006 |
| JP | 2007262536 A | 10/2007 |
| JP | 2008151277 A | 7/2008 |
| JP | 2011174526 A | 9/2011 |
| JP | 201419334 A | 2/2014 |
| JP | 2016205447 A | 12/2016 |
| KR | 20070114515 A | 12/2007 |
| WO | 2006131354 A2 | 12/2006 |
| WO | 2006131355 A2 | 12/2006 |

OTHER PUBLICATIONS

Ina, Polygon Bearings—Reducing Resonant Vibration in Automotive Differentials, Automotive Product Information API Jul. 11, 2000, 27 pages.
Japan Patent Office. Notification of Reason for Refusal for application 2019-536505, dated Aug. 25, 2020. With translation.
Intellectual Property India. Office action for application 201917025474, dated Oct. 29, 2019. 5 pages.
Canadian Intellectual Property Office. Office Action for application 3,048,482, dated Dec. 15, 2020. 4 pages.

* cited by examiner

NVH MODIFICATION FOR DIFFERENTIAL ASSEMBLY

CROSS-REFERENCE TO RELATED APPLICATION

This application represents the national stage entry of International Application No. PCT/US2018/012334 filed Jan. 4, 2018, and claims the benefit of the filing date of U.S. Provisional Patent Application No. 62/442,720 entitled "NVH Modification for Differential Assembly" filed on Jan. 5, 2017, which are hereby incorporated by reference for all purposes as if set forth in their entirety herein.

STATEMENT OF FEDERALLY SPONSORED RESEARCH OR DEVELOPMENT

Not applicable.

FIELD OF THE INVENTION

This disclosure relates to differential assemblies. In particular, this disclosure relates to ways of reducing and/or modifying the noise, vibration, and harshness (hereinafter, "NVH") in differentials by the addition of silencer pinions or other NVH-modifying members.

BACKGROUND

Differential assemblies are often used to permit the differential rotation of one shaft relative to another shaft. As one example, when a vehicle navigates a turn, a length of an outer wheel path is greater than a length of an inner wheel path over the distance of the turn. Accordingly, when a vehicle travels along a turn, this requires the outer wheel and the half shaft to which the outer wheel is connected to rotate more times over the duration of the turn than the inner wheel and the half shaft to which the inner wheel is connected.

In order to accommodate and permit this unequal amount of rotation across the sides of the vehicle, a differential assembly is conventionally placed centrally between the pair of half shafts. In the case of a rear differential assembly for the rear wheels, a propeller shaft transmits power into the differential and causes a rotation of a ring gear and a set of smaller pinion gears which orbit about the central axis of the ring gear with the ring gear as it rotates. This axis is coincident with the axis of rotation of the half shafts. The pinion gears intermesh with a set of side gears at the ends of the half shaft.

In order to drive the vehicle using (in part) the rear differential, the propeller shaft drives the rotation of the ring gear which causes the orbiting of the pinion gears. As these pinion gears rotate, they transmit the torque from the propeller shaft, via the ring gear and the connected pinion gears usually supported by an interconnecting carrier, to the pair of side gears which are each connected to one of the rear half shafts. When the wheels attached to the half shafts rotate at the same rate, the pinion gears orbit the central axis of the ring gear, but do not separately rotate about their own respective axes. When the wheels attached to the half shafts rotate at different rates, the pinion gears both orbit the central axis of the ring gear and further separately rotate about their own axes. In both cases, torque is transmitted from the pinions to the side gears attached to the half shafts. However, in the condition in which the vehicle is turning, the rotation of the pinions accommodates different rates of rotation of the side gears relative to one another.

In many newer all wheel drive vehicles, the rear differential—which is connected to the rear set of wheels—may only selectively be driven by the rear propeller shaft. In this way, the vehicle can be alternated between two-wheel drive and all- or four-wheel drive in order to improve economy and gas mileage. When the rear propeller shaft is disconnected from driving the rear differential such that the vehicle is placed in two-wheel drive mode, the rear propeller shaft and the ring gear are designed to stop spinning. Under these conditions, one of the two rear half shafts is also disconnected from its respective side gear in the differential assembly to permit the two rear wheels and their half shafts to rotate "freely" and sometimes at different rates as the rear wheels are pulled along with the vehicle.

When the rear propeller shaft and ring gear are locked and one of the half shafts is rotationally disconnected from its side gear, the pinion gears may be subjected to exceptionally high rotational speeds. Under the aforementioned conditions, all of the rotation of one of the rear wheels is transmitted into the rear differential assembly via the one of the side gears that is connected to the connected half shaft. Because the ring and pinions are locked in place, the rotation of this side gear is directly and completely transmitted into the pinion gears, which in turn transmit this rotation fully and completely into the side gear of the disconnected half shaft, irrespective of the differential rate at which the connected and disconnected half shafts are turning relative to one another. Accordingly in this disconnected mode, the pinion gears will rotate more and faster than when the rear differential is connected. By some estimates, the rotational speed of the pinions in a disconnected state may be nearly 100 times greater than the rotational speed of the pinions under turning conditions for the vehicle.

SUMMARY

In the disconnected state of a differential assembly of the type described above, the pinion gears of the assembly can be subjected to exceptionally high rotation speeds. Under this exceptional level of rotational speed, the typical noise and vibration emitted from the differential is amplified from what it would be under the lower rotational speeds of the pinions when the differential serves to transmit torque from the rear propeller shaft to the half shafts in the connected mode. This noise and vibration from high speed pinion rotation may resonate in other parts of the vehicle, may create a monotonic noise at cruising speeds, and may be intense enough that it is disruptive to the driving experience by creating unacceptably high levels of noise in the cabin of the vehicle.

While one specific use case for a differential with especially high NVH emission is described above, it should be appreciated that this use case is only representative and that differentials may emit undesirable NVH under other operating conditions for a variety of reasons.

Disclosed herein are improved differential assemblies which can reduce and/or modify the noise, vibration, and harshness generated by the differential assembly during operation. While these improvements might be utilized in any type of differential assembly, they are considered to be of particular benefit in rear differential assemblies of the type described above in which a locked ring gear and a disconnected half shaft results in the passive transmission of rotation from the other connected half shaft entirely into the pinion gears of the differential assembly.

In order to help silence or dampen noise and vibration, the improved differential assembly can include "silencer" pinions or other NVH-modifying elements in addition to the load- or torque-transmitting pinions of the differential assembly. These silencer pinions or other NVH-modifying elements do not substantially transmit torque as do the pinion gears through the differential assembly, but serve to dampen noise and vibration and/or change the frequency of the NVH generated so that it is not monotonic or generates resonance in other parts of the vehicle. These NVH-modifying elements might take a number of different geometric forms or be made of sound dampening materials such as low density powder metal, polymeric materials, or combinations of various materials. In short, these NVH-modifying elements are extra components in the differential assembly that are not designed to be load bearing or torque transmitting (although it is contemplated the NVH-modifying elements may still transmit some torque in some designs), but which alter the noise and vibration signature of the differential assembly. It is contemplated that these NVH-modifying members need not be shaped like traditional pinions (especially as they are not load bearing or torque transmitting), but may have other shapes and forms that achieve a similar NVH-modifying effect.

According to one aspect, a differential assembly is disclosed for modification (which includes both reduction and/or alteration) of one or more of a noise, vibration, and harshness (NVH) emitted from the differential assembly. The differential assembly includes a set of pinion gears, a pair of side gears, and at least one NVH-modifying element (which may be one or potentially a plurality of NVH-modifying elements and which do not necessarily need to be similar to one another). The set of pinion gears is connected to the housing such that the set of pinion gears travel with the rotation of the housing to orbit about the rotational axis of the housing as the housing rotates. Each respective pinion gear of the set of pinion gears is also rotatable about a respective rotational axis of the respective pinion gear. The pair of side gears are intermeshed with the set of pinion gears. The NVH-modifying element(s) are connected to the housing such that the NVH-modifying element(s) travel with the rotation of the housing about the rotational axis of the housing and are positioned to engage the set of side gears.

The NVH-modifying element(s) may reduce and/or modify one or more of a noise, vibration, and harshness emitted from the differential assembly under at least some operational conditions of the differential assembly in comparison to an otherwise identical differential assembly lacking the NVH-modifying element(s).

In one particular form, the differential assembly may be, for example, a rear differential assembly with the housing including a ring gear adapted to be selectively driven by a rear propeller shaft and with the pair of side gears each being adapted for connection to a respective half shaft. In this form, the rear differential may be operated under conditions in which the differential assembly is disconnected from the rear propeller shaft and the ring gear is rotationally locked, in which one of the half shafts connected to the side gear is disconnected from a wheel of a vehicle, and in which the rotation of the other wheel during motion of the vehicle causes the other one of the half shafts (which is connected) to drive the rotation of the respective side gear such that the set of pinion gears intermeshed with the side gears are subjected to rotational speeds directly from the connected one of the half shafts driven by the wheel on the road. Under such conditions, with one of the half shafts being disconnected, the pinion gears may be driven at exceptionally high rates dictated by road speed and not merely the rotational rate difference between the side gears. Such road speed rates for rotation of the pinion may be approximately 100 times that of a differential assembly under standard, connected operation when both half shafts are connected to the wheels and side gears. As noted above, unmitigated by NVH-modifying element(s), such rotational speeds can result in unacceptably loud noise in the cabin, vibrations, and other reverberations throughout the vehicle. However, the presence of the NVH-modifying element(s) can reduce and/or modify the NVH emitted from the differential assembly.

It should be noted that while an example form in which the differential assembly is a rear differential assembly is described above, that it is fully contemplated that the NVH-modifying element(s) may be used in other types of differentials, such as, for example, front differentials. Still yet, the NVH-modifying element(s) may be used in differentials other than in vehicle or automotive differentials. While this application uses disconnecting differentials as an exemplary situation in which NVH-modifying element(s) may be employed, the concept of employing NVH-modifying element(s) is certainly not so limited.

It is contemplated that the NVH-modifying element(s) may take a variety of forms. In one form, the NVH-modifying element(s) may be gear-shaped. In another form, the NVH-modifying element(s) may have a conical surface that contacts a top land surface of each of the side gears. Moreover, hybrid forms between gear forms and conical surfaces are also contemplated and these forms may be partially gear-like and partially-conical. While the various described geometric forms are exemplary, they are certainly not limiting and other forms or shapes may be employed to similar effect.

In some forms, the NVH-modifying element(s) may include an axially-truncated silencer pinion. It is contemplated that, in some forms, the NVH-modifying element(s) may include a plurality of stacked slices with surfaces generally perpendicular to a central axis thereof.

To assist in reducing and/or modifying the NVH of the differential assembly during operation, the NVH-modifying element(s) may be a different material than the set of pinion gears. For example, the NVH-modifying element(s) may be a polymeric material, such as an elastomeric material. As another example, the NVH-modifying element(s) may also be a sintered powder metal material. It is contemplated that the NVH-modifying element(s) may be the only sintered powder metal component(s) in the differential assembly or other components may also be formed from sintered powder metal materials. In the case of there being multiple sintered powder metal components in the differential assembly, the NVH-modifying element(s) may be a first sintered powder metal material and the set of pinion gears may be a second sintered powder metal material. To help provide the intended effect, the first sintered powder metal material may have a porosity higher than the second sintered powder metal material or may have a density lower than the second sintered powder metal material. In some forms, it is contemplated that the sintered powder metal material of the NVH-modifying element(s) may further comprise a self-lubricating material.

It is contemplated that in some forms, the NVH-modifying element(s) may be non-load bearing and non-torque transmitting in the differential assembly. Thus, while the NVH-modifying element(s) are present, they may not perform a mechanical function beyond their use as "silencer" pinions or NVH modifying elements.

In some forms, there may be a plurality of NVH-modifying elements, and one (or more) of the NVH-modifying elements may have a different shape or material than another one (or more) of the NVH-modifying elements.

Thus, a differential assembly is provided which help to modify and/or reduce the NVH emitted by the differential assembly (especially during operation in a disconnected state of a rear differential assembly). By the addition of the NVH-modifying element(s), an otherwise conventional differential assembly can be given an NVH-modifying or dampening element or elements which can have NVH reducing, absorption, or cancellation effects. As these NVH-modifying element(s) can be non-load bearing and non-torque transmitting, they may be designed with NVH modification in mind and may avoid design considerations typically associated with load bearing, torque transmitting pinion elements. In this sense, there is exceptional design flexibility to accommodate a particular differential design and the NVH-modifying elements may be produced in a number of different ways to optimize performance for a particular differential package or operating conditions of a given vehicle line.

These and still other advantages of the invention will be apparent from the detailed description and drawings. What follows is merely a description of some preferred embodiments of the present invention. To assess the full scope of the invention the claims should be looked to as these preferred embodiments are not intended to be the only embodiments within the scope of the claims.

DETAILED DESCRIPTION

Figure 1:
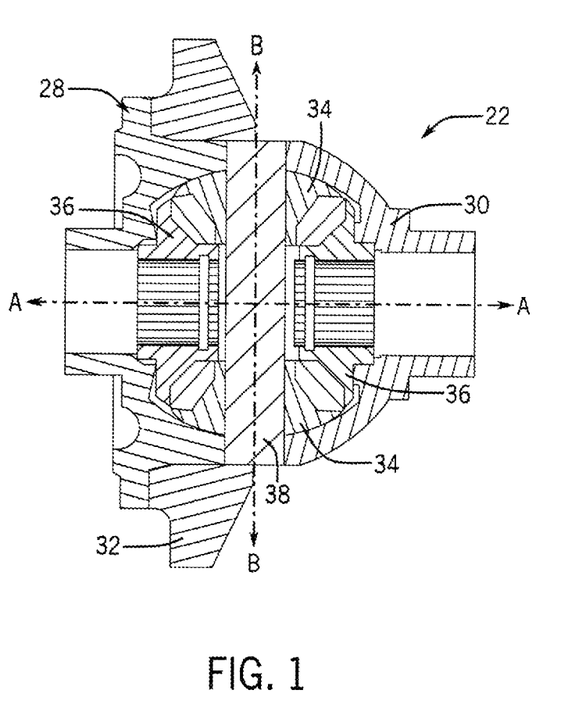
FIG. 1 is a sectioned view of a ring gear, pinions, and side gear of a rear differential assembly.

Looking now at FIG. 1, many of the components of a differential assembly 22 are shown in detail. In the form shown in FIG. 1, the differential assembly 22 is a rear differential assembly, but it will be apparent from the description that follows that the improvements related to NVH-modification may be applied to any kind of differential, whether a front or rear differential for a vehicle or a differential in any other type of application. In general, the differential assembly 22 includes a housing 28 which houses a carrier 30 supporting a ring gear 32, a set of pinion gears 34 and a set of side gears 36. A central axis A-A is shown on FIG. 1 that is co-parallel with a pair of rear half shafts (not shown) and which also defines the axis of rotation for the carrier 30, the ring gear 32, and the set of side gears 36. The ring gear 32 has teeth which may be driven by the end of a propeller shaft (not shown) to cause the rotation of the ring gear 32 and the carrier 30 attached thereto.

The set of pinion gears 34 contained within the carrier 30 are held in place by a support 38, which extends through the carrier 30 in a direction that is parallel with an axis B-B. The axis B-B is generally perpendicular to the axis A-A and also defines a rotational axis for each of the set of pinion gears 34 received on the support 38. When the ring gear 32 and the carrier 30 rotate, the set of pinion gears 34 will orbit the axis A-A with the rotation of the carrier 30. Accordingly, the set of pinion gears 34 are capable of both orbiting the axis A-A while also rotating about their own rotational axis B-B. While two pinion gears are illustrated in the attached figure set, it should be appreciated that this figure set is illustrative and not limiting and that, in other embodiments, there may be more pinion gears in the set.

The set of pinion gears 34 intermesh with the set of side gears 36 at their respective teeth. Both sets of gears 34 and 36 are bevel gears having teeth that are at an angular incline relative to the axis of rotation. The side gears 36 are connected to the ends of the respective rear half shafts (not shown) at an internal splined connection. These side gears 36 are rotatable independently of the carrier 30, although in some operational conditions, the side gears 36 may rotate with the carrier 30.

In use, when the propeller shaft and both rear half shafts are connected, such as in an all-wheel drive mode of a vehicle, the mechanical energy of the propeller shaft is transmitted into the ring gear 32 of the housing 28, which rotates about axis A-A along with the attached carrier 30 and the set of pinion gears 34 (and the NVH-modifying elements, described below). When both wheels are rotating at the same speed on the road (i.e., when the vehicle is traveling straight), the torque is evenly transmitted from the pinion gears 34, which are substantially not rotating about axis B-B but are orbiting about axis A-A, to the side gears 36 to drive the rear half shafts. If one rear half shaft is rotating faster than the other (usually because one wheel is travelling a further distance because the vehicle is turning), then not only is the torque transmitted through the differential assembly 22 from the ring gear 32 to the rear half shafts but also the set of pinion gears 34 rotate about axis B-B to accommodate for differential amount of rotation of one of the rear half shafts relative to the other of the rear half shafts.

However, as noted in the background section above, if the rear propeller shaft and one of the half shafts are disconnected, then both rear wheels are pulled along with the vehicle and the forward portion of the drive train 10 exclusively generates the motion of the car. Under these circumstances, the rotation of the ring gear 32 and carrier 30 about the axis A-A are locked with the connected one of the rear half shafts driving the connected side gear 36. With the rotation of the carrier 30 being locked, the side gear 36 directly drives the set of pinion gears 34 which are able to rotate about their own axis B-B, but not orbit about the axis A-A. The rotation of the pinion gears 34 also cause the disconnected one of the rear half shafts to rotate although this rotation is not further transmitted to another element, because this rear half shaft is disconnected.

Under these disconnected conditions, the set of pinion gears 34 will rotate at the speed dictated by the rotation transmitted from the connected one of the rear half shafts via the side gear 36. This means that pinion gears 34 will rotate at exceptionally high rates compared to rotational rates in a connected state in which the pinion gears 34 only rotate about axis B-B to accommodate the differential between the side gears 32. It is estimated that in the disconnected state of the drive train 10 the pinion gears may rotate up to 100 times faster than under typical connected state usage conditions.

Under such disconnected conditions, the high rotational speed of the pinion gears 34 might produce noise, vibration, and harshness ("NVH"). Such NVH conditions produced by the differential can create sounds and vibration within the vehicle cabin that are monotonic, unacceptably loud, and upset the driving experience.

Now with additional reference to FIGS. 2 and 3A through 3C, various NVH-modifying elements are illustrated in two exemplary forms. These NVH-modifying elements are additional elements introduced into the differential assembly 22 and engage (at least to some limited extent) the set of side gears 36. These NVH-modifying elements are designed to modify and/or reduce the NVH that is emitted by the overall differential assembly 22, especially during operation in a "disconnected" mode. While the use of such NVH-modifying elements is particularly helpful in this context and application, it is thoroughly contemplated that the NVH-modifying elements may also be beneficial in altering the NVH produced by any differential assembly or state of use. Without being limited to a particular theory, it is believed that the NVH-modifying elements may introduce micro-disruptions into the otherwise cyclic operation of the differential assembly 22 that cancel the NVH produced by the differential assembly 22 or may deaden or dampen the NVH produced by the differential assembly 22 in the first instance.

Figure 2:
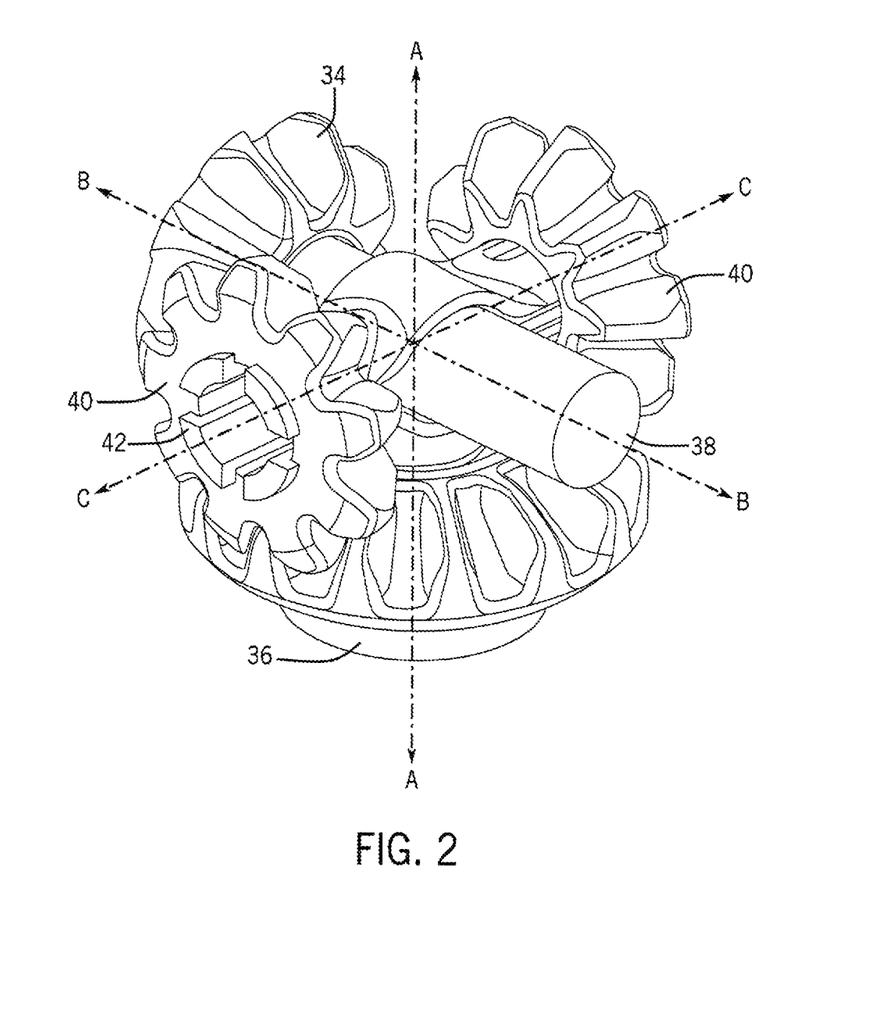
FIG. 2 is a perspective view illustrating portions of a differential assembly including NVH-modifying elements according to a first embodiment in which one of the side gears and one of the pinion gears are omitted to better illustrate the concept and the NVH-modifying elements.

Looking now specifically at FIG. 2, a pair of NVH-modifying elements 40 are illustrated in a fractional part of the differential assembly 22 in which the NVH-modifying elements 40 are effectively additional gears with a geometry generally resembling a pinion or bevel gear. Note that, in FIG. 2, only one of the pair of pinion gears 34 and one of the pair of side gears 36 are illustrated so that the NVH-modifying elements 40 may be better illustrated, although in the completed assembly the other opposing side gear and pinion gear would be present. Also note that the assembly is rotated approximately 90 degrees from the orientations illustrated in FIG. 1, such that the illustrated side gear 36 is on the bottom of the illustrated figure.

In the particular form illustrated, it can be seen that the set of NVH-modifying elements 40 are effectively additional "silencer" pinions that are mounted on a cross-support 42 along an axis C-C, which is perpendicular to both of axes A-A and B-B. As illustrated, the cross-support 42 is two halves that sandwich around the support 38 and have the NVH-modifying elements 40 received on the axial ends thereof.

While the NVH-modifying elements 40 may generally resemble the set of pinion gears 34, the set of NVH-modifying elements 40 are, in fact, quite different than the set of pinion gears 34 in some notable ways. For one, the set of NVH-modifying elements 40 do not transmit torque or mechanical power from the carrier 30 to the side gears 36 as do the set of pinion gears 34. To ensure that the NVH-modifying elements 40 are not torque-transmitting, they may have, for example, a different geometry than the set of pinion gears 34 and/or may be made of a different material such that they are not load-transmitting from the ring gear 32 and carrier 30 to the side gears 36.

To highlight one exemplary geometry and as illustrated in FIG. 2, the NVH-modifying elements 40 may be gear-shaped having axially-inclined teeth that engage the teeth of the side gears 36. It is contemplated that in some forms, the gear form of the NVH-modifying elements 40 may have a form similar to the pinion gears 34, except that the size is slightly smaller. In other forms, the geometry of the NVH-modifying elements 40 might be identical to the pinion gears 34, but the material of the NVH-modifying elements 40 may be different than the pinion gears 34, such that the NVH-modifying elements 40 are not torque transmitting in contrast to the pinion gears 34 which are torque-transmitting. However, instead of having a gear form, the NVH-modifying elements 40 might alternatively have a conical surface in which the conical surface of the NVH-modifying elements 40 engage the top land surface of each of the side gears 36. It is further yet contemplated that the NVH-modifying elements might have a hybrid form or geometry between the gear form and the conical form containing some gear teeth, but having a profile that might be more shallow than the gear form of the pinion gears or that may be missing some teeth relative to the number of teeth in the pinion gears.

Regardless of the particular geometry of the NVH-modifying elements 40, the material of the NVH-modifying elements 40 may be different than the material of the pinion gears 34. As one non-limiting example, the material of the NVH-modifying elements 40 may be a polymeric material, such as an elastomeric material. As another example, the material of the NVH-modifying elements 40 may be a sintered powder metal material. In many differential assemblies, the pinion gears 34 may also be made from a sintered powder metal material and the pinion gears 34 may also be forged to provide excellent density and strength. Accordingly, it is contemplated that the NVH-modifying elements 40 may be formed from a different powder metal material than the pinion gears 34 and/or may have a different sintered density or porosity or may have a different geometry resulting from processing conditions. In one form, the NVH-modifying elements 40 may be a first sintered powder metal material, while the pinion gears 34 may be a second sintered powder metal material. The first sintered powder metal material may have a porosity higher than the second sintered powder metal material and/or may have a density lower than the second powder metal material. It is contemplated in some forms, the NVH-modifying elements 40 may have a chemical composition (or starting powder metal) similar to the pinion gears 34 or may have a chemical composition (or starting powder metal) different to the pinion gears 34. In some forms, the sintered powder metal material of the NVH-modifying elements 40 may include a self lubricating material in the powder metal composition that is distributed, at least in part, on the surface of the NVH-modifying elements 40 so that, during use, the self-lubricating material is present on the bearing surfaces between the NVH-modifying elements 40 and the side gears 36. It is contemplated that, for NVH-modifying elements made of powder metal steel, the densities may be from 5.6 g/cc and include metal sponge and, for NVH-modifying elements made from powder metal aluminum, the densities may be from 2.0 g/cc.

Further, it should be appreciated that while two NVH-modifying elements are illustrated in FIG. 2, that different quantities of NVH-modifying elements may be used. In some forms, there may be one, two, three, four, or more NVH-modifying element(s) and the number of NVH-modifying element(s) 40 may match the number of pinion gears 34 or be different than the number of pinion gears 34. Further, it should be appreciated that where there is more than one NVH-modifying element, that each of the NVH-modifying elements may be the same as one another in shape and/or material or may be different from one another in at least one of shape and/or material. For example, they may be formed out of a single, similar, or dissimilar metallic and/or polymeric materials or combinations thereof, and they may be symmetrical, non-symmetrical, uniform, or non-uniform in structure (or combinations thereof) with one another.

Figure 3A:
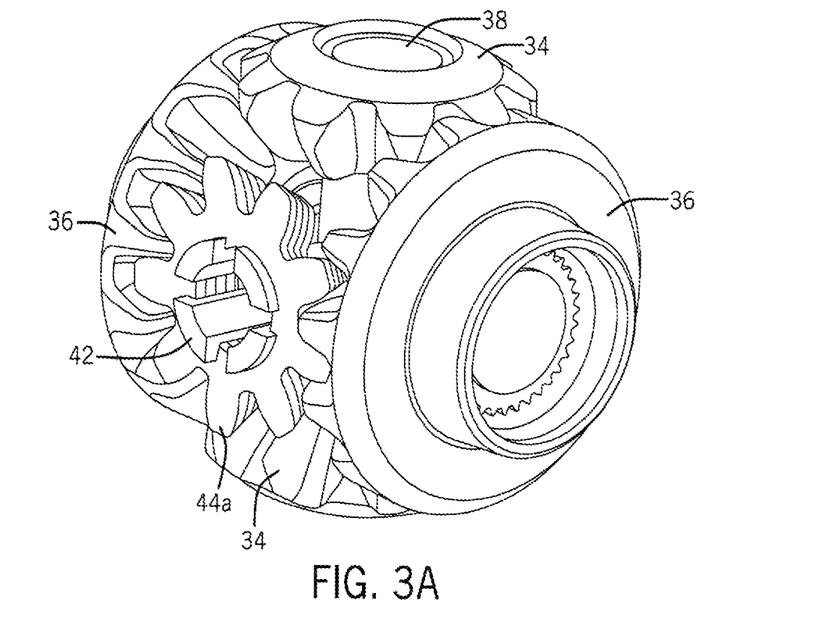
FIG. 3A through 3C are views of a second embodiment of a portion of a differential assembly illustrating a pair of side gears, a pair of pinion gears, and a set of NVH-modifying elements different than that illustrated in FIG. 2.
Figure 3B:
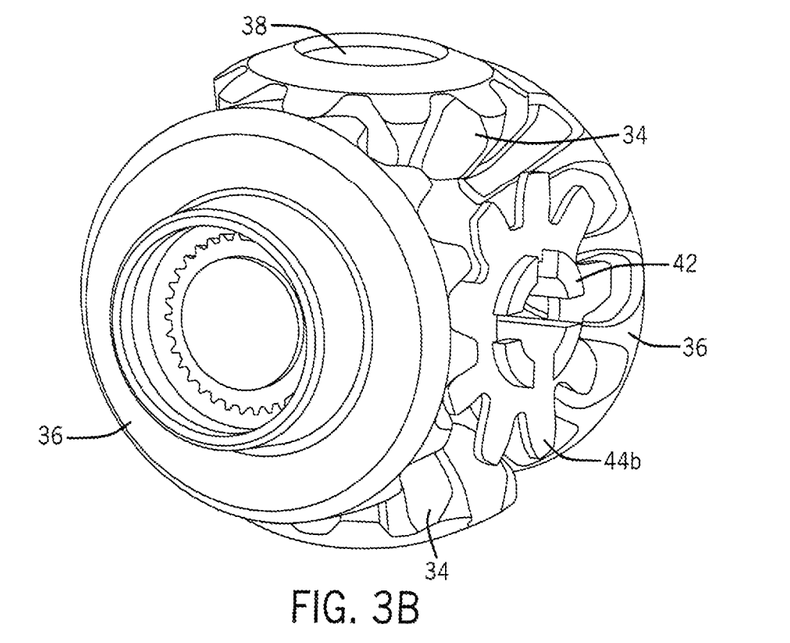
Figure 3C:
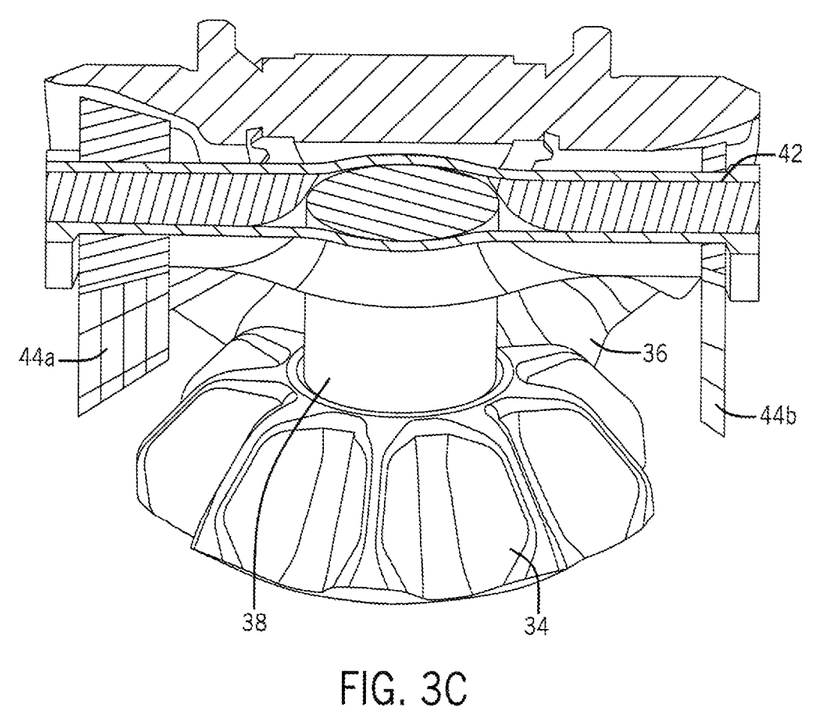

FIGS. 3A through 3C illustrate one example of an alternative arrangement providing multiple different NVH-modifying elements in a single differential. In FIGS. 3A through 3C, the NVH-modifying elements 44a and 44b are each formed of one or more slices of a pinion-shaped form and are received on the cross-support 42 similar to the cross-support illustrated in FIG. 2. In the particular form illustrated, these slices are of equal thickness to one another and the NVH-modifying element 44a includes four slices while the NVH-modifying element 44b includes only a single slice. It will, of course, be appreciated that other number of slices might be found on each of the NVH-modifying elements and this is only a single exemplary configuration. Both of the NVH-modifying elements 44a and 44b are slightly axially truncated relative to the geometry of the pinion gears.

It is contemplated that the NVH-modifying element or elements may be made of multiple materials. For example, in the NVH-modifying elements 44a and 44b in FIGS. 3A-3C above, the slices could be fabricated from alternating materials such as, for example, alternating metallic and polymeric materials (e.g., an elastomeric material) in which a first slice is metallic, a second slice is polymeric, and so forth. In some forms, it is contemplated the polymeric material might be molded in place between the metallic layers in such a manner that the polymer adheres to the metal. Still yet, it is contemplated that the metallic layers could be slightly angularly offset (perhaps even just a fraction of a degree) from one another to provide some differential or springiness in the response of the NVH-modifying element(s). In still other forms, it is contemplated that the NVH-modifying element(s) might be formed from multi-material powder metal materials in which different layers are formed in the NVH-modifying element(s) so that different regions made of different materials respond differently from one another to assist in modifying the NVH of the differential. These are just a few examples of potential multi-material designs for NVH-modifying element(s) and others may also be employed.

It should be appreciated that while some exemplary NVH-modifying elements have been illustrated and described, that the forms illustrated and described are certainly not the only NVH-modifying elements that are contemplated as falling within the scope of this disclosure. Indeed, in a very general sense, it is contemplated that any non-load or torque transmitting element in the differential may be used to alter and/or reduce the NVH generated by the differential (or even some elements that transmit some nominal amount of torque). It is also contemplated that while the NVH-modifying elements are particularly useful in a rear differential assembly in a vehicle that is selectively switchable between a two-wheel drive mode and an all-wheel drive mode, that nothing would prevent NVH-modifying elements from being used in a front differential or other types of differentials to modify and/or reduce the NVH produced by the differential. The contextual example of the rear differential assembly is described because, in that context, the use of NVH-modifying elements is believed to be of particular benefit given the NVH emitted in the disconnected state.

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A differential assembly for modification of at least one of a noise, vibration, and harshness (NVH) emitted from the differential assembly, the differential assembly comprising:
   a set of pinion gears connected to a housing such that the set of pinion gears travel with the rotation of the housing to orbit about the rotational axis of the housing as the housing rotates, each respective pinion gear of the set of pinion gears further being rotatable about a respective rotational axis of the respective pinion gear;
   a pair of side gears intermeshed with the set of pinion gears; and
   at least one NVH-modifying element connected to the housing such that the at least one NVH-modifying element travels with the rotation of the housing about the rotational axis of the housing, the at least one NVH-modifying element positioned to engage the set of side gears;
   wherein the at least one NVH-modifying element has a rotational axis perpendicular to the rotational axis of the housing and perpendicular to the rotational axis of the pinion gears.

2. The differential assembly of claim 1, wherein the at least one NVH-modifying element modifies at least one of a noise, vibration, and harshness emitted from the differential assembly under at least some operational conditions of the differential assembly in comparison to an otherwise identical differential assembly lacking the at least one NVH-modifying element.

3. The differential assembly of claim 1, wherein the housing includes a ring gear adapted to be selectively driven by a rear propeller shaft and wherein the pair of side gears are each adapted for connection to a respective half shaft.

4. The differential assembly of claim 1, wherein the at least one NVH-modifying element is gear-shaped.

5. A differential assembly for modification of at least one of a noise, vibration, and harshness (NVH) emitted from the differential assembly, the differential assembly comprising:
   a set of pinion gears connected to a housing such that the set of pinion gears travel with the rotation of the housing to orbit about the rotational axis of the housing as the housing rotates, each respective pinion gear of the set of pinion gears further being rotatable about a respective rotational axis of the respective pinion gear;
   a pair of side gears intermeshed with the set of pinion gears; and
   at least one NVH-modifying element connected to the housing such that the at least one NVH-modifying element travels with the rotation of the housing about the rotational axis of the housing, the at least one NVH-modifying element positioned to engage the set of side gears;
   wherein the housing includes a ring gear adapted to be selectively driven by a rear propeller shaft and wherein the pair of side gears are each adapted for connection to a respective half shaft; and
   wherein the at least some operational conditions under which the differential assembly is configured to modify at least one of the noise, vibration, and harshness emitted in comparison to an otherwise identical differential assembly lacking the at least one NVH-modifying element includes an operation of the differential assembly when the differential assembly is disconnected from the rear propeller shaft and the ring gear is rotationally locked, one of the half shafts connected to the side gear is disconnected from a wheel of a vehicle, and rotation of the other wheel during motion of the vehicle causes the other one of the half shafts to drive the rotation of the respective side gear such that the set of pinion gears intermeshed with the side gears are subjected to rotational speeds directly from the connected one of the half shafts driven by the wheel on the road.

6. A differential assembly for modification of at least one of a noise, vibration, and harshness (NVH) emitted from the differential assembly, the differential assembly comprising:
a set of pinion gears connected to a housing such that the set of pinion gears travel with the rotation of the housing to orbit about the rotational axis of the housing as the housing rotates, each respective pinion gear of the set of pinion gears further being rotatable about a respective rotational axis of the respective pinion gear;
a pair of side gears intermeshed with the set of pinion gears; and
at least one NVH-modifying element connected to the housing such that the at least one NVH-modifying element travels with the rotation of the housing about the rotational axis of the housing, the at least one NVH-modifying element positioned to engage the set of side gears;
wherein the at least one NVH-modifying element has a conical surface that contacts a top land surface of each of the side gears.

7. A differential assembly for modification of at least one of a noise, vibration, and harshness (NVH) emitted from the differential assembly, the differential assembly comprising:
a set of pinion gears connected to a housing such that the set of pinion gears travel with the rotation of the housing to orbit about the rotational axis of the housing as the housing rotates, each respective pinion gear of the set of pinion gears further being rotatable about a respective rotational axis of the respective pinion gear;
a pair of side gears intermeshed with the set of pinion gears; and
at least one NVH-modifying element connected to the housing such that the at least one NVH-modifying element travels with the rotation of the housing about the rotational axis of the housing, the at least one NVH-modifying element positioned to engage the set of side gears;
wherein the at least one NVH-modifying element comprises a different material than the set of pinion gears.

8. The differential assembly of claim 7, wherein the at least one NVH-modifying element comprises a polymeric material.

9. The differential assembly of claim 7, wherein the at least one NVH-modifying element comprises an elastomeric material.

10. The differential assembly of claim 7, wherein the at least one NVH-modifying element comprises a sintered powder metal material.

11. The differential assembly of claim 10, wherein the at least one NVH-modifying element comprises a first sintered powder metal material and the set of pinion gears comprises a second sintered powder metal material and wherein the first sintered powder metal material has a porosity higher than the second sintered powder metal material.

12. The differential assembly of claim 10, wherein the at least one NVH-modifying element comprises a first sintered powder metal material and the set of pinion gears comprises a second sintered powder metal material and wherein the first sintered powder metal material has a density lower than the second sintered powder metal material.

13. The differential assembly of claim 10, wherein the sintered powder metal material of the at least one NVH-modifying element comprises a self-lubricating material.

14. A differential assembly for modification of at least one of a noise, vibration, and harshness (NVH) emitted from the differential assembly, the differential assembly comprising:
a set of pinion gears connected to a housing such that the set of pinion gears travel with the rotation of the housing to orbit about the rotational axis of the housing as the housing rotates, each respective pinion gear of the set of pinion gears further being rotatable about a respective rotational axis of the respective pinion gear;
a pair of side gears intermeshed with the set of pinion gears; and
at least one NVH-modifying element connected to the housing such that the at least one NVH-modifying element travels with the rotation of the housing about the rotational axis of the housing, the at least one NVH-modifying element positioned to engage the set of side gears;
wherein the at least one NVH-modifying element is non-load bearing and non-torque transmitting in the differential assembly.

15. A differential assembly for modification of at least one of a noise, vibration, and harshness (NVH) emitted from the differential assembly, the differential assembly comprising:
a set of pinion gears connected to a housing such that the set of pinion gears travel with the rotation of the housing to orbit about the rotational axis of the housing as the housing rotates, each respective pinion gear of the set of pinion gears further being rotatable about a respective rotational axis of the respective pinion gear;
a pair of side gears intermeshed with the set of pinion gears; and
at least one NVH-modifying element connected to the housing such that the at least one NVH-modifying element travels with the rotation of the housing about the rotational axis of the housing, the at least one NVH-modifying element positioned to engage the set of side gears;
wherein the at least one NVH-modifying element includes a plurality of NVH-modifying elements.

16. The differential assembly of claim 15, wherein one of the plurality of NVH-modifying elements has a different shape or material than another one of the plurality of NVH-modifying elements.

17. A differential assembly for modification of at least one of a noise, vibration, and harshness (NVH) emitted from the differential assembly, the differential assembly comprising:
a set of pinion gears connected to a housing such that the set of pinion gears travel with the rotation of the housing to orbit about the rotational axis of the housing as the housing rotates, each respective pinion gear of the set of pinion gears further being rotatable about a respective rotational axis of the respective pinion gear;
a pair of side gears intermeshed with the set of pinion gears; and
at least one NVH-modifying element connected to the housing such that the at least one NVH-modifying element travels with the rotation of the housing about the rotational axis of the housing, the at least one NVH-modifying element positioned to engage the set of side gears;
wherein the at least one NVH-modifying element includes an axially-truncated silencer pinion.

18. The differential assembly of claim 17, wherein the at least one NVH-modifying element includes a plurality of stacked slices with surfaces generally perpendicular to a central axis thereof.

* * * * *